(12) United States Patent
Erkek et al.

(10) Patent No.: US 10,932,641 B2
(45) Date of Patent: Mar. 2, 2021

(54) AUTOMATICALLY MOVING FLOOR TREATMENT APPLIANCE

(71) Applicant: Vorwerk & Co. Interholding GmbH, Wuppertal (DE)

(72) Inventors: David Erkek, Aarau (CH); Georg Hackert, Bochum (DE); Gerhard Isenberg, Cologne (DE); Roman Ortmann, Huerth (DE); Andreas Schmidt, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 367 days.

(21) Appl. No.: 16/001,352

(22) Filed: Jun. 6, 2018

(65) Prior Publication Data
US 2018/0353044 A1 Dec. 13, 2018

(30) Foreign Application Priority Data
Jun. 9, 2017 (DE) ...................... 10 2017 112 796.8

(51) Int. Cl.
*A47L 11/40* (2006.01)
*A47L 9/28* (2006.01)
(Continued)

(52) U.S. Cl.
CPC ......... *A47L 11/4097* (2013.01); *A47L 9/2805* (2013.01); *A47L 11/24* (2013.01); *A47L 11/4011* (2013.01); *F24F 3/1603* (2013.01); *G05D 1/0238* (2013.01); *G05D 1/0274* (2013.01); *G08B 17/103* (2013.01); *A47L 2201/00* (2013.01); *A47L 2201/04* (2013.01); *A47L 2201/06* (2013.01);
(Continued)

(58) Field of Classification Search
CPC ............. A47L 11/4097; A47L 11/4011; A47L 9/2805; A47L 11/24; A47L 2201/00; A47L 2201/04; A47L 2201/06; F24F 3/1603; F24F 2221/42
See application file for complete search history.

(56) References Cited

U.S. PATENT DOCUMENTS

| 8,364,309 B1 | 1/2013 | Bailey |
| 2008/0206092 A1* | 8/2008 | Crapser ................ F24F 3/1603 422/5 |

(Continued)

FOREIGN PATENT DOCUMENTS

| DE | 10 2008 014 912 A1 | 9/2009 |
| DE | 10 2011 000 536 A1 | 8/2012 |

(Continued)

*Primary Examiner* — Robert Clemente
(74) *Attorney, Agent, or Firm* — Collard & Roe, P.C.

(57) ABSTRACT

An automatically moving floor treatment appliance has a floor treatment element for acting on a surface to be treated, and a control device for controlling the floor treatment element. To increase the area of application of the floor treatment appliance, the control device is embodied to automatically control the floor treatment element as a function of a measuring result from an air parameter sensor in such a way that a floor treatment of the surface to be treated occurs using the floor treatment element and/or to automatically control the floor treatment element as a function of environmental data stored in an external storage device and relating to an air quality.

12 Claims, 4 Drawing Sheets

(51) Int. Cl.
*A47L 11/24* (2006.01)
*F24F 3/16* (2021.01)
*G05D 1/02* (2020.01)
*G08B 17/103* (2006.01)

(52) U.S. Cl.
CPC ... *F24F 2003/1689* (2013.01); *F24F 2221/42* (2013.01); *G05D 2201/0203* (2013.01)

(56) References Cited

U.S. PATENT DOCUMENTS

| | | | | |
|---|---|---|---|---|
| 2012/0125363 | A1* | 5/2012 | Kim | A47L 9/2852 134/6 |
| 2016/0278593 | A1* | 9/2016 | Lee | G05D 1/0246 |
| 2016/0334800 | A1* | 11/2016 | Han | G05D 1/0274 |
| 2017/0172368 | A1* | 6/2017 | Chiu | G08B 25/10 |
| 2018/0137728 | A1* | 5/2018 | Hahn | G08B 13/19697 |
| 2018/0353039 | A1* | 12/2018 | Erkek | A47L 11/4066 |
| 2018/0353041 | A1* | 12/2018 | Erkek | G05D 1/0022 |
| 2018/0356834 | A1* | 12/2018 | Erkek | B25J 11/0085 |
| 2018/0360282 | A1* | 12/2018 | Erkek | A47L 9/28 |
| 2018/0360285 | A1* | 12/2018 | Erkek | A47L 9/2894 |
| 2018/0364661 | A1* | 12/2018 | Hackert | A47J 36/32 |
| 2019/0022854 | A1* | 1/2019 | Hackert | B25J 9/1697 |
| 2019/0023396 | A1* | 1/2019 | Hackert | A01G 7/06 |
| 2020/0229669 | A1* | 7/2020 | Arnold | A47L 9/2894 |
| 2020/0233428 | A1* | 7/2020 | Arnold | G05D 1/0221 |

FOREIGN PATENT DOCUMENTS

| | | |
|---|---|---|
| DE | 10 2015 113 035 A1 | 2/2017 |
| DE | 10 2016 124 901 A1 | 6/2018 |
| JP | 2004-174149 A | 6/2004 |

\* cited by examiner

Fig. 2

AUTOMATICALLY MOVING FLOOR TREATMENT APPLIANCE

CROSS REFERENCE TO RELATED APPLICATIONS

Applicant claims priority under 35 U.S.C. § 119 of German Application No. 10 2017 112 796.8 filed Jun. 9, 2017, the disclosure of which is incorporated by reference.

BACKGROUND OF THE INVENTION

1. Field of the Invention

The invention relates to an automatically moving floor treatment appliance comprising a floor treatment element for acting on a surface to be treated, and a control device for controlling the floor treatment element.

The invention likewise relates to a system of at least one automatically moving floor treatment appliance, which floor treatment appliance has a floor treatment element for acting on a surface to be treated, comprising at least one air parameter sensor and a control device.

The invention furthermore relates to a method for operating an automatically moving floor treatment appliance, wherein a floor treatment element acts on a surface to be treated and wherein a control device controls the floor treatment elements, as well as to a method for operating a system of at least one automatically moving floor treatment appliance and at least one air parameter sensor.

2. Description of the Related Art

Automatically moving floor treatment appliances and methods for the operation thereof are known in the prior art.

Floor treatment appliances of this type can be embodied for example as cleaning robots, which have a navigation device for automatically moving and orientating in a surrounding area. The navigation device can for example have a distance sensor, which measures distances to obstacles within the surrounding area, if applicable additional contact sensors and/or an odometry measuring device, which measures a covered distance. By means of the measuring data, a surrounding area map can be generated for the floor treatment appliance, by means of which the floor treatment appliance can orientate itself.

Publication DE 10 2008 014 912 A1 discloses for example an automatically moving floor treatment appliance comprising an optical triangulation system for the distance measurement. The triangulation system has, among other things, a light source and a sensor for the light beams reflected by a measured object.

It is furthermore known in the prior art to also equip such floor treatment appliances with further elements, which provide for an additional task of the floor treatment appliance, in addition to the navigation system and one or a plurality of floor treatment elements for acting on a surface to be treated.

Publication DE 10 2015 113 035 A1 discloses for example a floor treatment appliance, which, in connection with an external element, makes it possible to detect smoke within the surrounding area. The floor treatment appliance has an evaluation device, which is embodied to detect a presence of smoke between the optical element and the external element during a cooperation of an optical element of the floor treatment appliance and the external element, and to prompt an alarm signal.

SUMMARY OF THE INVENTION

Based on the above-mentioned prior art, it is the object of the invention to create an automatically moving floor treatment appliance, which is further development in an advantageous manner.

To solve the above-mentioned object, an automatically moving floor treatment appliance is initially proposed, comprising a floor treatment element for acting on a surface to be treated, and a control device for controlling the floor treatment element, wherein the control device is embodied to automatically control the floor treatment element as a function of a measuring result from an air parameter sensor and/or as a function of environmental data stored in an external storage device and relating to an air quality.

According to the invention, the floor treatment appliance is now set up to react to current measuring results from an air parameter sensor or to centrally stored environmental data, respectively, and to perform a floor treatment by means of the floor treatment element. For example, pollen contained in the ambient air can be brought into a living space and can deposit there on surfaces, in particular on floor surfaces. As a result of movements inside the living space, for example by persons and/or animals as well as air movements, which may be caused by a venting, if applicable, the pollen or, if applicable further particles are dispersed and permeate the ambient air. A negative impact on the air quality caused by this, in particular with regard to allergies, is now eliminated or is at least reduced, respectively, by systematically controlling the floor treatment element for a floor treatment, in particular cleaning. The control device of the floor treatment element thereby has a communication connection either to a local air parameter sensor of the floor treatment element, an external air parameter sensor arranged in the living space, or also an external storage device, in which relevant environmental data is stored. Based on the measured air parameters or stored environmental data, respectively, a use of the floor treatment appliance or of the floor treatment element thereof, respectively, can now be controlled. The floor treatment appliance can in particular adapt the planning of a cleaning or of a cleaning cycle on the basis of up-to-date and standard-related pollen count information, which is stored in a webserver, so that a cleaning occurs more frequently for example at point in time or on days with or after elevated pollen concentration, than is typically the case. The floor treatment element, which is used, can thereby in particular be a wet cleaning element, because the latter absorbs pollen or other particles, respectively, from a hard floor surface, more effectively, than it would be the case in response to a pure cleaning by suction.

It is furthermore proposed that the floor treatment appliance has an air parameter sensor and/or an air purification device for purifying ambient air, wherein the control device is set up to control the air parameter sensor and/or the air purification device, wherein the control device is in particular set up to control the air purification device and/or the floor treatment element as a function of a measuring result from the air parameter sensor.

In addition to the floor treatment element, the floor treatment appliance additionally has an air parameter sensor and/or an air purification device, according to this embodiment. On principle, the floor treatment appliance can be every automatically moving device, in particular a cleaning device, such as, for example, a robot vacuum cleaner, a mopping robot or the like. On principle, the floor treatment appliance can also be a mowing robot, a grinding and/or polishing device. The air parameter sensor measures one or a plurality of air parameters of the ambient air, which surrounds the floor treatment appliance. The control device can then control an operation of the floor treatment element and/or of the air purification device as a function of the measuring result, i.e. for example the air quality. In the event that the air parameter sensor is a smoke sensor, for example, the control device can control the floor treatment element of the floor treatment appliance for a cleaning of a floor surface and the air cleaning device for the removal of smoke particles from the ambient air, after detection of a smoke particle quantity, which exceeds a threshold value. Two different cleaning methods for cleaning the surrounding area can thus be used independently from one another, or also parallel in time.

The control device of the floor treatment appliance can have a communication connection to an external storage device, in which environmental data relating to an air quality is stored. The control device can in particular have a communication connection to a central webserver, for example a so-called cloud. On the one hand, environmental data relating to the air quality can be threshold values, which relate to substances located in the ambient air, for example threshold values for particles, pollen, metals, dust, hydrocarbons, carbon monoxide and the like. In addition, environmental data can also include a current and/or expected pollen concentration from a pollen forecast. On the one hand, for example a local pollen concentration can be determined by means of the air parameter sensor of the floor treatment appliance, and, on the other hand, the control device of the floor treatment appliance can also access an online database, which specifies a pollen forecast for the area of use of the floor treatment appliance. In this connection, provision can for example also be made for an operating plan of the floor treatment appliance, which is stored in a memory of the floor treatment appliance or inside the external storage device, to be adapted as a function of a forecast pollen concentration and/or other predictable environmental parameters, for example sand storms or the like, so as to start for example an immediate use of the floor treatment element and/or of the air cleaning device of the floor treatment appliance, to complete it or to adapt a future point in time and/or a frequency of a future use of the floor treatment element or of the air cleaning device, receptively.

The air parameter sensor of the floor treatment appliance can for example be a particle sensor, a pollen sensor, a metal sensor, a dust sensor, a hydrocarbon sensor, a $CO_2$ sensor, a SOx sensor, a NOx sensor, an air humidity sensor or another sensor, which measures substances contained in the air. The air purification device preferably has a filter material for filtering one or a plurality of harmful substances from the ambient air. The filter material can in particular be suitable to filter out metals, formaldehyde, toluene, pollen, smoke particles, dust, hydrocarbons, $CO_2$, SOx, NOx, fungal spores or allergens from the ambient air. The filter material can for example have a nonwoven filter web, an electrostatic filter, activated carbon, catalysts, HEPA filters, washable textile filters or the like. The air purification device can further also have a dehumidifier, which absorbs moisture from the ambient air. For this purpose, the air humidifier can for example have a fan for absorbing ambient air and a condensation device, at which liquid contained in the ambient air can condensate.

In addition to the floor treatment appliance, the invention furthermore proposes a system of at least one automatically moving floor treatment appliance, which floor treatment appliance has a floor treatment element for acting on a surface to be treated, at least one air parameter sensor and a control device, wherein the control device is embodied to control the floor treatment element and/or an air purification device to purify ambient air as a function of a measuring result from the air parameter sensor.

According to this invention, it is not required that the air purification device, the air parameter sensor and/or the control device are elements of the floor treatment appliance. In fact, they can be separate devices, which, together with the floor treatment appliance, form a system. On principle, the floor treatment appliance can also be an above-described floor treatment appliance, or one, which, in addition to the floor treatment element, has an air parameter sensor or an air purification device at least on its own. According to this embodiment, the system then has on the one hand for example the air parameter sensor of the floor treatment appliance and, on the other hand, an external air parameter sensor, or an air purification device of the floor treatment appliance and an external air purification device. A control device can advantageously control the plurality of air parameter sensors or air purification devices, respectively, for cooperation and/or for mutual supplementation. The system comprises at least one autonomous floor treatment appliance, such as, for example, a cleaning robot, one or a plurality of air parameter sensors, as well as one or a plurality of air purification devices. An external air parameter sensor or an external air purification device, respectively, is in communication connection with the control device, so that it is always known, which components are present within the system. The components are advantageously registered at the control device. In response to the registration, for example the appliance type and/or the appliance location can be detected. The registration can be carried out automatically, for example in response to an initial startup of the respective component and/or by means of a manual input at the control unit, wherein for example one component can be selected from a predefined list.

The air parameter sensor of the system can be a sensor of the floor treatment appliance, of the air purification device and/or of the control device. Provided that the air purification device or the control device, respectively, is an appliance, which is separate from the floor treatment appliance, the air parameter sensor can also be integrated therein. For example, the air purification device can be a pollutant filter unit, which simultaneously also has a pollutant sensor. A pollen filter unit can simultaneously also have a pollen sensor and the like. In the alternative, the air parameter sensor could be integrated in none of the other components of the system, but could be a separate air parameter sensor, which is connected to the control device of the system. A separate air parameter sensor is embodied, for example, according to the type of known smoke sensors or the like, which can be installed in a room area and which transmit a measuring signal to a control and evaluation device.

It is furthermore proposed that the control device is a device of the floor treatment appliance or of the air purification device. The control device serves as central control device for the system according to the invention and can be integrated into a component of the system, such as, for example, the floor treatment appliance or the air purification device. In the alternative, the control device, however, could also be a dedicated central unit, which has communication connections to the other components of the system. The communication between the floor treatment appliance, the air purification device, the air parameter sensor and/or the control device occurs for example via a radio connection, in particular WLAN, or via a wired communication connection, for example Power-LAN. The central control device of the system can furthermore be embodied to receive and to monitor measuring data from the air parameter sensor or also external environmental data, for example data from a pollen forecast. The central control unit furthermore controls the individual components of the system, in particular a use of a floor treatment element of the floor treatment appliance and/or an air purification device. The control device can carry out a comparison of the measuring data detected by means of the air parameter sensor with threshold values stored in a memory, and can control an air purification or a floor treatment, respectively, when necessary. Provided that the control device is for example a component of the floor treatment appliance, the floor treatment appliance simultaneously also takes over the function of a central control unit and controls the other components of the system, for example the air purification device and the air parameter sensor. The control device can furthermore be integrated into an air purification device, so that the air purification device takes over the function of the central control unit. Provision can thereby for example also be made for the air purification device to control the floor treatment element of the floor treatment appliance for an additional cleaning when an existence of allergens, dust, pesticides, metals and the like above a certain threshold value are determined, because a sole air purification by means of the air purification device is no longer effective and/or sufficient to clean the surrounding area.

Provision can furthermore be made for the control device to have a communication connection to an external storage device, in particular to a central web server, in which environmental data relating to an air quality are stored. For example, the external storage device can have a database, in which a pollen concentration, a heavy metal concentration, sand storms or the like for certain regions are stored in real time.

It is furthermore also possible that the control device is not embodied as a local unit, but is a program, which is stored in an external storage device, which remotely controls the components of the system.

It is in particular proposed that the floor treatment appliance is a wet cleaning appliance comprising a floor treatment element, which is embodied for a wet cleaning, and a liquid application device for applying liquid to the floor treatment element and/or a surface to be treated. Provided that the ambient air is polluted for example with pollen, particles, dust, allergens or the like, the latter also deposit on the floor surface of the surrounding area. Using a wet cleaning, performed by means of a wet cleaning appliance, a result can thereby on principle be attained, which is better than with a pure cleaning using suction, for example by means of a robot vacuum cleaner. The wet cleaning appliance has for example a cleaning roller or a flat cleaning element as floor treatment element, which have a pad, which absorbs a liquid, for example a textile cleaning cloth, a non-woven material or the like. The wet cleaning appliance is preferably equipped with its own liquid application device, which guides liquid from a liquid tank to the floor treatment element and/or directly onto the surface to be treated.

In addition to the above-described floor treatment appliance and the system according to the invention, a method for operating an automatically moving floor treatment appliance is furthermore also proposed, wherein a floor treatment element acts on a surface to be treated and wherein a control device controls the floor treatment element, wherein the control device automatically controls the floor treatment element and/or an air purification device to clean ambient air as a function of a measuring result from an air parameter sensor and/or as a function of environmental data stored in an external storage device and relating to an air quality. It is in particular proposed that the control device controls an air parameter sensor and/or an air purification device for purifying ambient air, wherein the control device is in particular set up to control the air purification device and/or the floor treatment element as a function of a measuring result from the air parameter sensor.

A method for operating a system of at least one automatically moving floor treatment appliance and at least one air parameter sensor is furthermore also proposed, wherein the air parameter sensor measures a parameter of an ambient air and a control device controls a floor treatment element of the floor treatment appliance to clean a surface and/or an air purification device to purify ambient air as a function of a measuring result from the air parameter sensor. This method is suitable to operate a system of a plurality of components, which are embodied and arranged separately from one another, such as, for example, one or a plurality of air purification devices, one or a plurality of air parameter sensors, and a floor treatment appliance.

The method for the operation of the floor treatment appliance or the method for operating a system, respectively, include that an air parameter sensor measures an air parameter of the ambient air, for example a portion of pollen, dust particles, metal particles, pesticides, allergens, hydrocarbons, $CO_2$, SOx, NOx, humidity in the ambient air. This measuring result is received and evaluated by the control device, if applicable by means of a separate evaluation device. The control device subsequently controls measures to improve the air quality, namely to remove the above-mentioned particles or pollutants, respectively, from the ambient air or from a floor surface. These measures include an operation of the air purification device to purify the ambient air and/or an operation of the floor treatment element of the floor treatment appliance. The further features and advantages of the method according to the invention thereby follow as described above with reference to the floor treatment appliance or the system, respectively.

Provision can in particular be made for the control device to access an external storage device, in which environmental data relating to an air quality is stored. The external storage device can for example be a central webserver. Environmental data relating to the air quality is for example data provided online about pollen concentrations, pollutant concentrations, humidity and the like. Environmental data provided in the external storage device can be queried for this location as a function of a known location of the floor treatment appliance and/or of the air parameter sensor and/or of the air purification device. If applicable, the environmental data provided by an online database can also be compared and/or evaluated in connection with local measuring data from one or a plurality of air parameter sensors.

As a whole, the proposed methods for operating an automatically moving floor treatment appliance or for operating a system of one or a plurality of floor treatment appliances, respectively, and at least one air parameter sensor now provide for a linking of a plurality of floor treatment appliances, wherein individual cleaning uses of one or a plurality of floor treatment appliances can be carried out by means of measurements or environmental data, which can be evaluated online, in order to e.g. actively reduce a pollen concentration inside the living spaces. The best possible cleaning strategy with all of the available floor treatment appliances can thereby be planned and carried out in particular by a central storage device, depending on pollution or contamination situation, respectively. In particular, one or a plurality of floor treatment appliances can be used on the basis of locally measured air parameters or pollen count information defined for certain regions from a local memory or from a webserver, to plan a use of a floor treatment appliance, to change an operating plan of one or a plurality of floor treatment elements, so that more frequent operating cycles can be planned either spontaneously or also ahead of time for days with elevated particle concentration, in particular pollen concentration. A central control device of a system can in particular select a floor treatment appliance, which is suitable for a certain cleaning use, from a plurality of floor treatment appliances, and can control it accordingly. In addition to the floor treatment appliances or the floor treatment elements thereof, respectively, separate air purification devices can also be controlled, which then additionally perform an air purification inside the living spaces.

BRIEF DESCRIPTION OF THE DRAWINGS

The invention will be described in more detail below by means of exemplary embodiments.

DETAILED DESCRIPTION OF THE PREFERRED EMBODIMENTS

Figure 1:
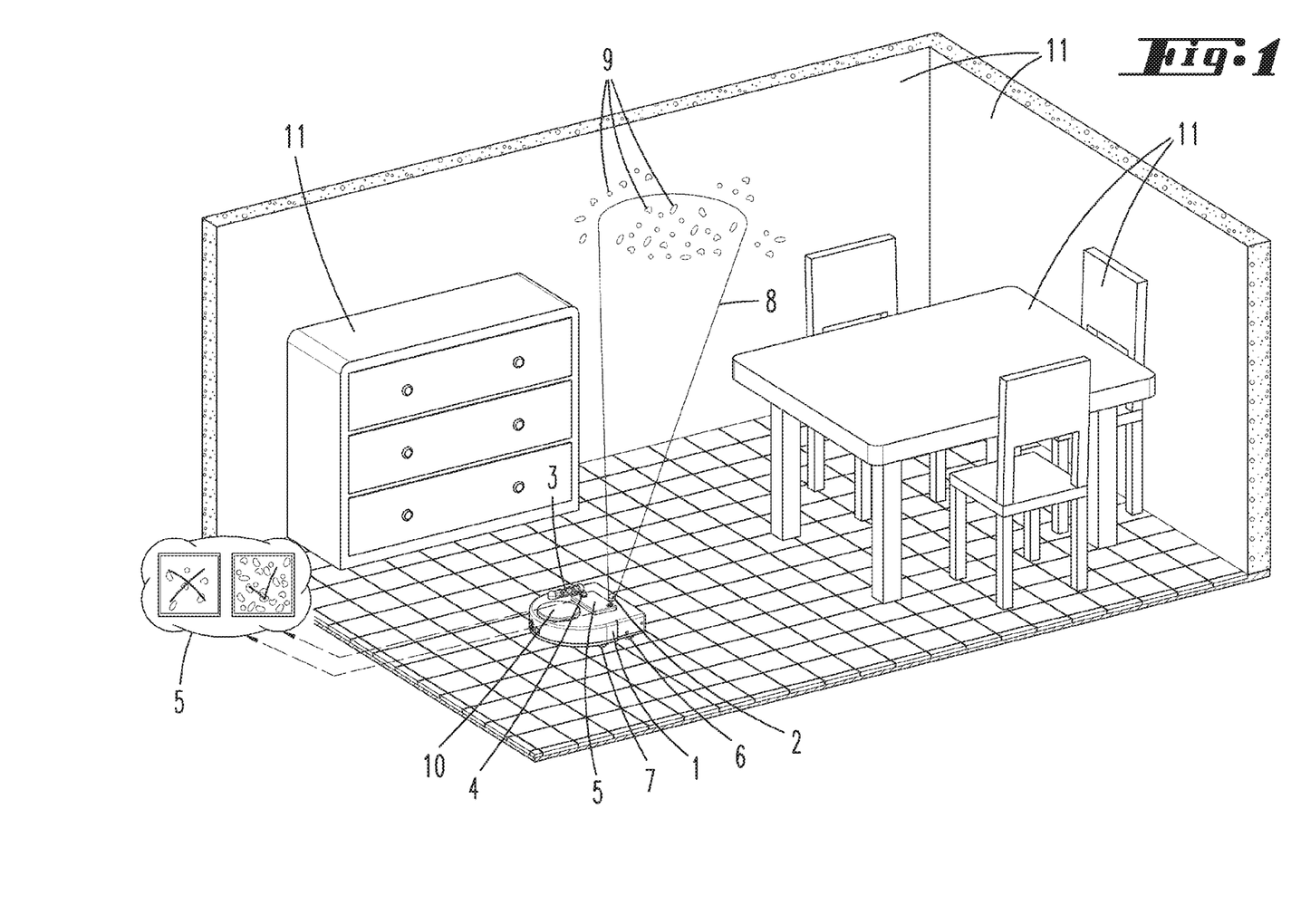
FIG. 1 shows a first embodiment of the invention.

FIG. 1 shows a room of home, here for example a dining room, in which a plurality of obstacles 11 is present. Here, the obstacles 11 are pieces of furniture, such as for example a table, three chairs, and a chest of drawers. Obstacles 11 are furthermore also room boundaries of the room, namely the walls.

A floor treatment appliance 1, which is embodied here for example as wet mopping appliance, is located in the room. The floor treatment appliance 1 has a plurality of motor-driven wheels 7 for moving the floor treatment appliance 1 inside the room. The floor treatment appliance 1 furthermore has a navigation device comprising an obstacle detection device 10, which is embodied here for example as optical distance measuring device. The obstacle detection device 10 measures distances to the obstacles 11 arranged in the room. A control device 4 of the floor treatment appliance 1 creates a surrounding area map of the room or, if applicable, of additional rooms of the home, respectively, from the distance measuring data, by means of which the floor treatment appliance 1 can orientate itself during a movement.

The floor treatment appliance 1 has a floor treatment element 6, which is for example a cleaning roller here, which rotates in a motor-driven manner and thereby sweeps across a floor surface of the room. It goes without saying that, in the alternative, other types of floor treatment elements 6 are also possible, in particular flat plates, which are equipped with a cleaning pad. A liquid tank and a liquid application device can be assigned to the floor treatment element 6, which are suitable to apply liquid to the floor treatment element 6 and/or the floor surface, to be able to carry out a mopping operation of the floor treatment appliance 1 in an advantageous manner. A local storage device 5 of the floor treatment appliance 1 serves for example to store the surrounding area map of the floor treatment appliance 1. The control device 4 is in communication connection with the storage device 5, so that the control device 4 can access the data stored therein.

The floor treatment appliance 1 furthermore has an air purification device 3, which includes a pollen filter here. The floor treatment appliance 1 furthermore has an air parameter sensor 2, which is set up to measure particles 9 inside a detection area 8 of the air parameter sensor 2. Here, the particles 9 are for example pollen, which are present in the ambient air. The air parameter sensor 2 is for example an optical sensor, which carries out a measurement of the degree of reflection or which records an image of the surrounding area. An evaluating device of the floor treatment appliance 1 compares the measuring data to stored reference values, wherein the reference values are stored inside the storage device 5 of the floor treatment appliance 1. For example, a comparison is carried out here inside the storage device 5, wherein reference values for different particle concentrations are compared. The control device 4 of the floor treatment appliance 1 is set up to control the floor treatment element 6, the integrated air purification device 3, and also the integrated air parameter sensor 2. For this purpose, the control device 4 has a communication connection to the respective component.

The invention according to this embodiments works for example in such a way that the floor treatment appliance 1 moves around inside the illustrated room, preferably by using a surrounding area map, in which the obstacles 11 are recorded. While moving, the air parameter sensor 2 measures an air parameter of the ambient air surrounding the floor treatment appliance 1. Here, a concentration of particles 9 located inside the detection area 8 of the air parameter sensor 2 is measured. For example, a light source of the air parameter sensor 2 emits light into the room and measures a radiation, which is reflected back onto an optical chip of the air parameter sensor 2. The larger the concentration of the particles 9 inside the ambient air or inside the detection area 8, the higher the amplitude of the detected measuring signal. The measuring signal is subsequently compared to reference data, which is stored inside the storage device 5. As soon as a correspondence is detected, measures of the floor treatment appliance 1, which are defined for this particle concentration, can be controlled. The measures are preferably also stored inside the storage device 5. The measures determined for the concentration of particles 9 determined here can for example include an operation of the air purification device 3 and an operation of the floor treatment element 6. On the one hand, particles 9 are absorbed directly from the ambient air by means of the air purification device 3. For this purpose, the air purification device 3 can advantageously have a fan for absorbing ambient air and a particle filter. On the other hand, particles 9 located on the floor of the room are removed by means of the floor treatment element 6, namely in the context of a wet cleaning. As a whole, a combination of an air purification and a floor cleaning thus results in a particularly advantageous manner, to optimally remove the particles 9. In the case of lower concentrations of the particles 9, provision can for example be made for either only the floor treatment element 6 or only the air purification device 3 to be operated. The type of the cleaning can furthermore also be a function of the type of the detected particles 9. Provided that they are particularly large and heavy particles 9, for example, which fall quickly to the floor, a cleaning by means of the floor treatment element 6 can be particularly preferred. Provided that they are rather small, relatively light particles 9, which stay inside the ambient air for a long time, an operation of the air purification device 3 lends its self primarily, in order to directly remove the particles 9 from the ambient air.

Figure 2:
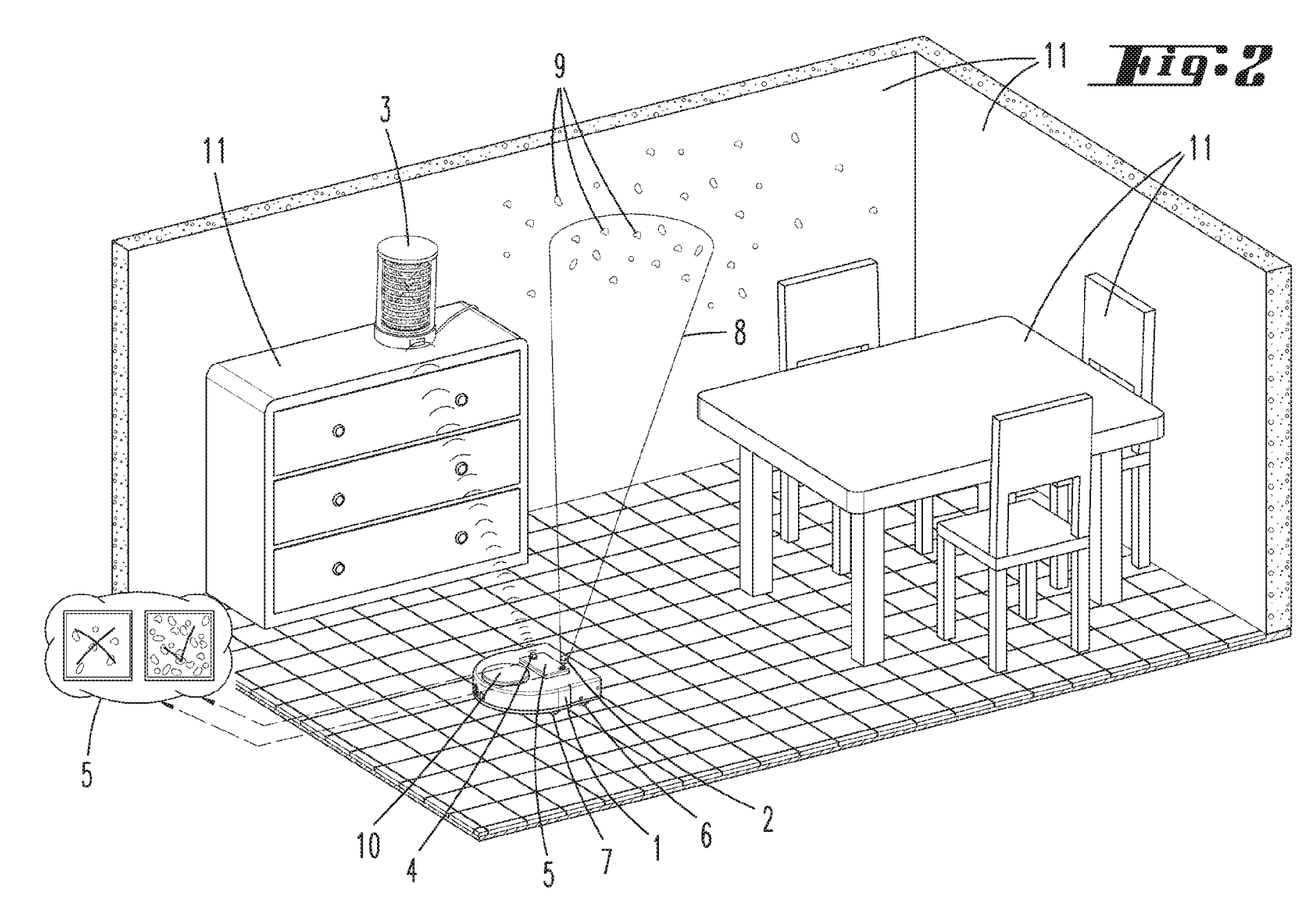
FIG. 2 shows a second embodiment of the invention.

FIG. 2 shows a second embodiment of the invention, which uses a system, which, in addition to an automatically moving floor treatment appliance 1, furthermore has an air purification device 3, which is embodied separately thereto. The air purification device 3 communicates with the control device 4 of the floor treatment appliance 1, namely here for example via a WLAN connection. According to this embodiment, the control device 4 of the floor treatment appliance 1 serves as central control device 4, which is set up to control the external air purification device 3 as well as the components of the floor treatment appliance 1, namely here the air parameter sensor 2 and the floor treatment element 6. Here, the floor treatment appliance 1 does not have its own air purification device 3, whereby the embodiments, in which the system has an external air purification device 3 as well as an air purification device 3 of the floor treatment appliance 1, are possible as well. It is furthermore also conceivable that the system has a plurality of floor treatment appliances 1 and/or a plurality of air purification devices 3 and/or a plurality of air parameter sensors 2, which can also be arranged outside of the floor treatment appliance 1, for example inside the air purification device 3 or on a wall of the illustrated room.

The invention according to the embodiment illustrated in FIG. 2 occurs in such a way that the air parameter sensor 2 of the floor treatment appliance 1 measures a concentration of particles 9 inside the detection area 8. The measuring data, in turn, is compared to reference values stored inside the storage device 5. As a function of the result of the comparison, the control device 4 determines measures for removing the detected particles 9. Here, the control device 4 controls for example the operation of the floor treatment element 6 and the operation of the external air purification device 3, wherein the control device 4 transmits a control command to the external air purification device 3 via the WLAN connection.

Figure 3:
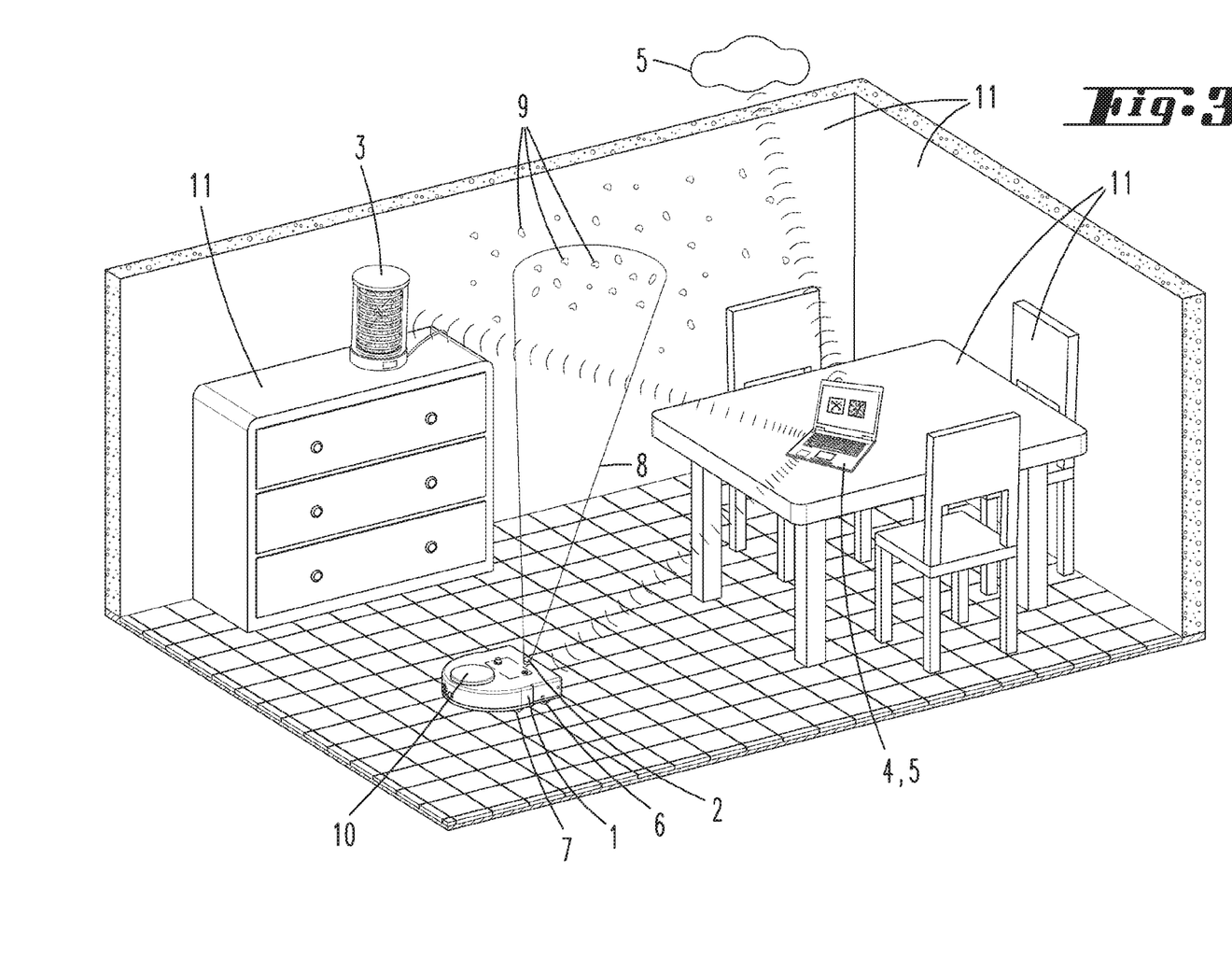
FIG. 3 shows a third embodiment of the invention.

FIG. 3 shows a further embodiment of the invention, which has a system of an automatically moving floor treatment appliance 1, an air purification device 3 embodied separately thereto, and an external control device 4 embodied separately thereto. The control device 4 is here part of a mobile end device, namely here of a laptop computer. The mobile end device furthermore also has a local storage device 5. The mobile end device is furthermore also connected to an external storage device 5 via a radio connection, namely here a cloud server. The external storage device 5 includes an online database, in which for example current pollen count forecasts are stored. The control device 4 has a communication connection, namely here radio connection, to the floor treatment appliance 1 and to the air purification device 3. Control commands can be transmitted by the control device 4 to the air purification device 3 or the floor treatment appliance 1, respectively, via this radio connection, and for example measuring data can be transmitted from the floor treatment appliance 1 to the central control device 4 on the other hand.

According to this embodiment, the invention works for example in such a way that the floor treatment appliance 1 is located inside the room or moves inside the room and thereby measures particles 9 inside the detection area 8 of the air parameter sensor 2. The measuring data is transmitted via the radio connection to the external control device 4, namely here the laptop. There, the measuring data is compared to reference data, which is stored inside the local storage device 5 of the laptop. As a function of the particle concentration, a control command is then transmitted to the air purification device 3, so that the air purification device 3 is operated to absorb particles 9 from the ambient air. A control command is furthermore also transmitted from the central control device 4 to the floor treatment appliance 1, namely for the operation of the floor treatment element 6, so as to mop up particles 9, which are already located on the floor. The air parameter sensor 2 measures further particle concentrations in the ambient air either continuously or within certain time intervals, and transmits them to the central control device 4. Provided that it is determined that the particle concentration drops below a threshold value again, the air purification device 3 and/or the floor treatment element 6 can be turned off. The central control device 4 further accesses the environmental data stored inside the external storage device 5, namely the cloud. Here, this environmental data includes a current pollen count forecast for a region, within which the illustrated room is located. Provided that it is determined that a high pollen count is currently at hand, the air purification device 3 and/or the floor treatment element 6 of the floor treatment appliance 1 can be continued to be operated, if necessary, even if the pollen concentration currently measured by means of the air parameter sensor 2 of the floor treatment appliance 1 lies below a defined threshold value. Provision can also be made for a cleaning plan for the floor treatment appliance 1 to be stored inside the local storage device 5 of the control device 4. This cleaning plan can for example provide for recurring cleaning uses of the floor treatment appliance 1 on certain days, at certain times of day or the like. The cleaning plan can be adapted as a function of the environmental data, which is constantly updated in the external storage device 5, so that a corresponding adaptation of the cleaning plan occurs for example in the case of a forecasted high pollen concentration during the next few days.

Figure 4:
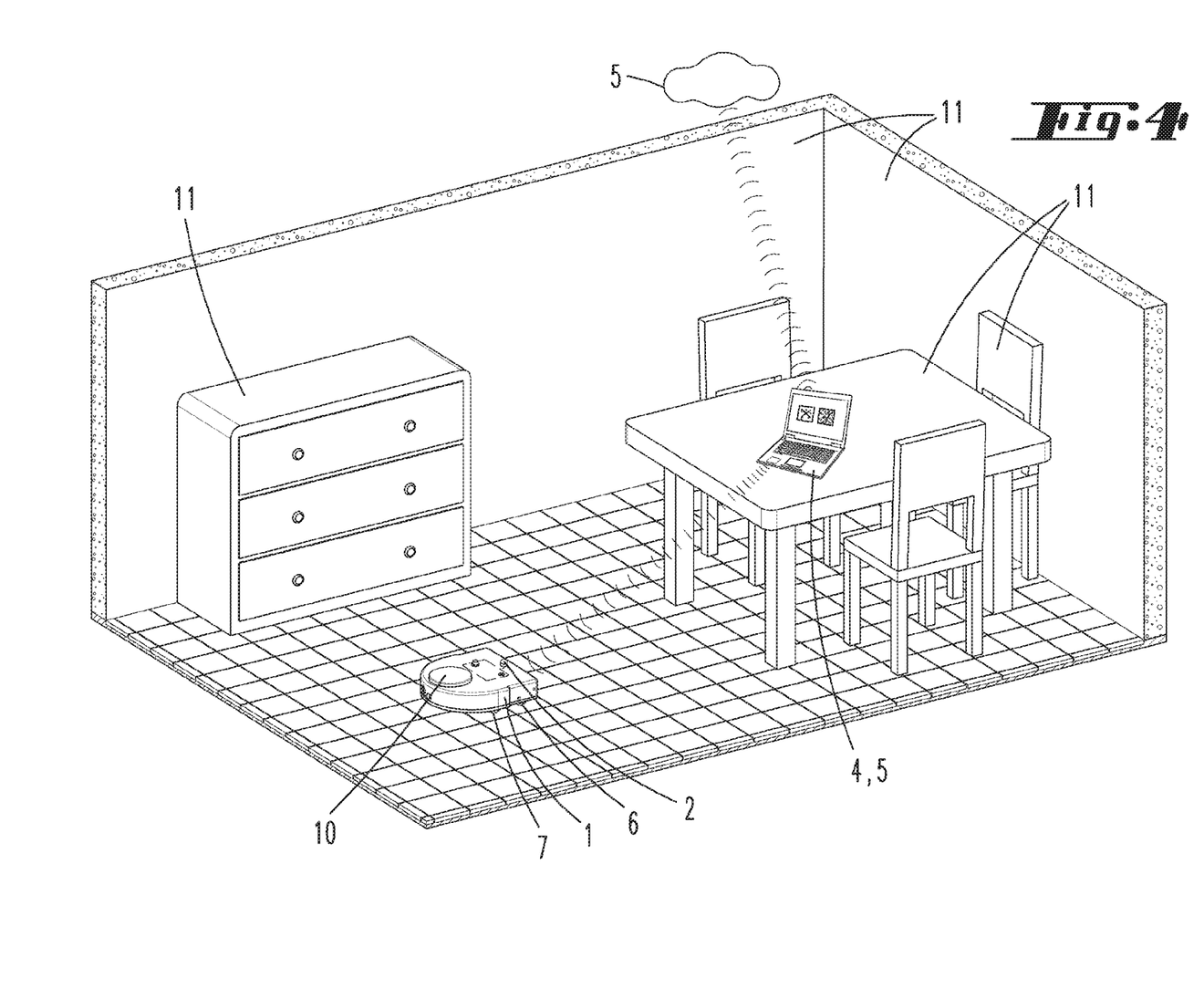
FIG. 4 shows a fourth embodiment of the invention.

FIG. 4 shows a fourth embodiment of the invention, in which the floor treatment appliance 1 has a communication connection to an external control device 4, namely here a laptop. The control device 4 has a communication connection to a local storage device 5 as well as to an external storage device 5, namely here a cloud. According to this embodiment, the floor treatment appliance 1 does not have its own air parameter sensor 2 and its own air purification device 3. In the usual manner, the floor treatment appliance 1 does in fact have a floor treatment element 6. Apart from that, no technical changes are embodied on the floor treatment appliance 1. The external control device 4 serves to centrally control the floor treatment appliance 1 and, if applicable, further (non-illustrated) floor treatment appliances 1. For this purpose, the control device 4 accesses the external control device 5, in which environmental data relating to an air quality is stored, here for example a pollen count forecast for a region, in which the illustrated living space is located. The control device 4 is embodied to transmit a control command to the floor treatment appliance 1, when it is detected that the storage device 5 has current pollen count forecasts, according to which the pollen concentration lies above a certain threshold value. The control device 4 can then control the floor treatment appliance 1 either currently for a floor cleaning task by means of the floor treatment element 6, or can change an operating plan stored in a local storage device 5 of the control device 4 in such a way that one or a plurality of cleaning cycles are controlled by means of the floor treatment appliance 1 at the time of the announced critical pollen concentration. The cleaning cycles of the respective floor treatment appliance 1 can in particular be adapted in such a way that on days with or on days after elevated pollen concentration, a cleaning is performed more frequently than was specified by the present operating plan. In the case of a linking of a plurality of floor treatment appliances 1 or in the case of a floor treatment appliance 1 comprising different floor treatment elements 6, a control of the floor treatment elements 6, which is matched to one another and which for example preferably performs a wet cleaning, can take place.

Even though this is not illustrated in the shown embodiments, it goes without saying that provision can be made for operating a plurality of floor treatment appliances 1, air parameter sensors 2, air purification devices 3, storage devices 5 and/or floor treatment elements 6 inside a system. The components of the system are preferably known among one another. Provision can in particular be made for a registration process, in which the individual components are detected on the control device 4. In response to the registration, for example the respective appliance type, the location or further information can be detected. The registration can be performed automatically, for example in response to the first startup of a component. In the alternative, a manual input by a user is possible as well. Instead of the outlined radio function, a wired communication can in the alternative also take place between components, for example via Power-LAN.

LIST OF REFERENCE NUMERALS

1 floor treatment appliance
2 air parameter sensor
3 air purification device
4 control device
5 storage device
6 floor treatment element
7 wheel
8 detection area
9 particles
10 obstacle detection device
11 obstacle

What is claimed is:

1. An automatically moving floor treatment appliance comprising:
    a floor treatment element for acting on a surface to be treated, and
    a control device for controlling the floor treatment element,
    wherein the control device is configured to automatically control the floor treatment element to treat the surface to be treated, as a function of at least one of:
        a measuring result from an air parameter sensor, and environmental data stored in an external storage device and relating to an air quality.

2. The floor treatment appliance according to claim 1, wherein the floor treatment appliance comprises the air parameter sensor and an air purification device for purifying ambient air, and wherein the control device is configured to control the air purification device and/or the floor treatment element as a function of a measuring result from the air parameter sensor.

3. The floor treatment appliance according to claim 1, wherein the control device has a communication connection to the external storage device in which environmental data relating to an air quality is stored.

4. The floor treatment appliance according to claim 1, wherein the air parameter sensor is selected from the group consisting of a particle sensor, a pollen sensor, a metal sensor, a dust sensor, a hydrocarbon sensor, a $CO_2$ sensor, a SOx sensor, a NOx sensor and a humidity sensor.

5. A system of at least one automatically moving floor treatment appliance, comprising:
    a floor treatment element for acting on a surface to be treated,
    at least one external air parameter sensor with regard to the floor treatment appliance, and
    a control device that is configured to control, as a function of a measuring result from the air parameter sensor, at least one of the floor treatment element and an external air purification device associated with the floor treatment appliance to purify ambient air.

6. The system according to claim 5, wherein the air parameter sensor is connected to the air purification device and/or to the control device, and/or is assigned to an external storage device, which has environmental data relating to an air quality.

7. The system according to claim 5, wherein the control device has a communication connection to an external storage device in which environmental data relating to an air quality is stored.

8. The system according to claim 5, wherein the air parameter sensor is selected from the group consisting of a particle sensor, a pollen sensor, a metal sensor, a dust sensor, a hydrocarbon sensor, a $CO_2$ sensor, a SOx sensor, a NOx sensor and a humidity sensor.

9. A method for operating an automatically moving floor treatment appliance, comprising:
    acting on a surface to be treated with the floor treatment element;
    and
    automatically controlling with a control device, based on a measuring result from an air parameter sensor and/or as a function of environmental data stored in an external storage device and relating to an air quality, at least one of:
        the floor treatment element for performing a floor treatment of the surface to be treated, and
        an external air purification device for cleaning ambient air.

10. The method according to claim 9, wherein an operating plan of the floor treatment appliance, which is stored in a storage device, is changed as a function of measured air parameters and/or environmental data relating to an air quality.

11. The method according to claim 9, wherein the control device accesses an external storage device in which environmental data relating to an air quality is stored.

12. A method for operating a system of at least one automatically moving floor treatment appliance and at least one air parameter sensor, comprising:
    measuring a parameter of an ambient air with the air parameter sensor; and
    controlling with a control device as a function of a measuring result from the air parameter sensor at least one of:
        a floor treatment element of a floor treatment appliance to clean a surface using the floor treatment element, and
        an external air purification device associated with the floor treatment appliance to clean ambient air.

* * * * *